United States Patent
Sasse et al.

(10) Patent No.: US 8,986,586 B2
(45) Date of Patent: Mar. 24, 2015

(54) ELECTRICAL CABLE HAVING CROSSLINKED INSULATION WITH INTERNAL PULLING LUBRICANT

(75) Inventors: Philip A. Sasse, Douglasville, GA (US);
Tim Andrea, Douglasville, GA (US)

(73) Assignee: Southwire Company, LLC, Wilmington, DE (US)

( * ) Notice: Subject to any disclaimer, the term of this patent is extended or adjusted under 35 U.S.C. 154(b) by 268 days.

(21) Appl. No.: 12/406,454

(22) Filed: Mar. 18, 2009

(65) Prior Publication Data

US 2010/0236811 A1      Sep. 23, 2010

(51) Int. Cl.
*H01B 3/44* (2006.01)
*C08L 23/04* (2006.01)
*C08L 51/06* (2006.01)

(52) U.S. Cl.
CPC .............. *C08L 23/04* (2013.01); *C08L 51/06* (2013.01); *C08L 2203/202* (2013.01); *C08L 2312/00* (2013.01); *H01B 3/441* (2013.01)
USPC .................................................. 264/171.14

(58) Field of Classification Search
CPC ........................ H01B 3/441; C08L 2203/202
USPC .................................................. 264/171.14
See application file for complete search history.

(56) References Cited

U.S. PATENT DOCUMENTS

| | | | |
|---|---|---|---|
| 2,276,437 A | 3/1942 | Vaala | |
| 2,685,707 A | 8/1954 | Llewellyn et al. | |
| 2,930,838 A | 3/1960 | Chizallet et al. | |
| 3,064,073 A | 11/1962 | Downing | |
| 3,108,981 A | 10/1963 | Clark et al. | |
| 3,191,005 A | 6/1965 | Cox 2nd | |
| 3,258,031 A | 6/1966 | French | |
| 3,333,037 A | 7/1967 | Humphrey et al. | |
| 3,378,628 A | 4/1968 | Garner | |
| 3,433,884 A | 3/1969 | Cogelia et al. | |
| 3,668,175 A | 6/1972 | Sattler | |
| 3,849,221 A | 11/1974 | Middleton | |
| 3,852,875 A | 12/1974 | McAmis et al. | |
| 3,868,436 A | 2/1975 | Ootsuji et al. | |

(Continued)

FOREIGN PATENT DOCUMENTS

| CA | 2726607 A1 | 12/2009 |
|---|---|---|
| CN | 202917210 U | 5/2013 |

(Continued)

OTHER PUBLICATIONS

Dow Corning, Dow Corning MB50-011 Masterbatch Product Information, Ultra-high molecular weight siloxane polymer dispersed in nylon 6, 1999, pp. 1-5.

(Continued)

*Primary Examiner* — Alison Hindenlang
(74) *Attorney, Agent, or Firm* — Gardere Wynne Sewell LLP

(57) ABSTRACT

Electrical power cable having a reduced surface coefficient of friction and required installation pulling force, and the method of manufacture thereof, in which the central conductor core, with or without a separate insulating layer, is surrounded by a sheath of crosslinked polyethylene. A high viscosity, high molecular weight silicone based pulling lubricant or fatty acid amide pulling lubricant is incorporated by alternate methods with the polyethylene to form a composition from which the outer sheath is extruded, and is effective to reduce the required pulling force on the cable during installation.

13 Claims, 6 Drawing Sheets

(56) References Cited

U.S. PATENT DOCUMENTS

| | | | |
|---|---|---|---|
| 3,877,142 A | 4/1975 | Hamano et al. |
| 3,885,286 A | 5/1975 | Hill |
| 3,936,572 A | 2/1976 | MacKenzie, Jr. et al. |
| 4,002,797 A | 1/1977 | Hacker et al. |
| 4,043,851 A | 8/1977 | Holladay et al. |
| 4,057,956 A | 11/1977 | Tolle |
| 4,099,425 A | 7/1978 | Moore |
| 4,100,245 A | 7/1978 | Horikawa et al. |
| 4,137,623 A | 2/1979 | Taylor |
| 4,273,806 A | 6/1981 | Stechler |
| 4,274,509 A | 6/1981 | Thomson et al. |
| 4,275,096 A | 6/1981 | Taylor |
| 4,299,256 A | 11/1981 | Bacehowski et al. |
| 4,356,139 A | 10/1982 | Rowland et al. |
| 4,360,492 A | 11/1982 | Rowland et al. |
| 4,416,380 A | 11/1983 | Flum |
| 4,454,949 A | 6/1984 | Flum |
| 4,522,733 A | 6/1985 | Jonnes |
| 4,547,246 A | 10/1985 | Viriyuthakorn et al. |
| 4,569,420 A | 2/1986 | Pickett et al. |
| 4,605,818 A | 8/1986 | Arroyo et al. |
| 4,673,516 A | 6/1987 | Berry |
| 4,684,214 A | 8/1987 | Goldmann et al. |
| 4,693,936 A | 9/1987 | McGregor et al. |
| 4,749,059 A | 6/1988 | Jonnes et al. |
| 4,751,261 A | 6/1988 | Miyata et al. |
| 4,761,445 A | 8/1988 | Chiba |
| 4,770,902 A * | 9/1988 | Barlow et al. | 427/117 |
| 4,773,954 A | 9/1988 | Starnes, Jr. |
| 4,806,425 A | 2/1989 | Chu-Ba |
| 4,868,054 A | 9/1989 | Kartheiser |
| 4,937,142 A | 6/1990 | Ogushi et al. |
| 4,940,504 A | 7/1990 | Starnes, Jr. |
| 4,952,021 A | 8/1990 | Aoki et al. |
| 4,965,249 A | 10/1990 | De With et al. |
| 5,036,121 A | 7/1991 | Coaker et al. |
| 5,055,522 A | 10/1991 | Ikeda et al. |
| 5,074,640 A | 12/1991 | Hardin et al. |
| 5,156,715 A | 10/1992 | Starnes, Jr. |
| 5,225,635 A | 7/1993 | Wake et al. |
| 5,227,080 A | 7/1993 | Berry |
| 5,252,676 A | 10/1993 | Suyama et al. |
| 5,324,588 A | 6/1994 | Rinehart et al. |
| 5,326,638 A | 7/1994 | Mottine, Jr. et al. |
| 5,346,383 A | 9/1994 | Starnes, Jr. |
| 5,356,710 A | 10/1994 | Rinehart |
| 5,383,799 A | 1/1995 | Fladung |
| 5,460,885 A | 10/1995 | Chu-Ba |
| 5,492,760 A * | 2/1996 | Sarma et al. | 428/378 |
| 5,505,900 A * | 4/1996 | Suwanda et al. | 264/477 |
| 5,561,730 A | 10/1996 | Lochkovic et al. |
| 5,565,242 A | 10/1996 | Buttrick, Jr. et al. |
| 5,614,288 A | 3/1997 | Bustos |
| 5,614,482 A | 3/1997 | Baker et al. |
| 5,656,371 A | 8/1997 | Kawahigashi et al. |
| 5,660,932 A | 8/1997 | Durston et al. |
| 5,708,084 A | 1/1998 | Hauenstein et al. |
| 5,733,823 A | 3/1998 | Sugioka et al. |
| 5,741,858 A * | 4/1998 | Brann et al. | 525/101 |
| 5,753,861 A | 5/1998 | Hansen et al. |
| 5,852,116 A | 12/1998 | Cree et al. |
| 5,856,405 A | 1/1999 | Hofmann |
| 5,886,072 A | 3/1999 | Linsky et al. |
| 5,912,436 A | 6/1999 | Sanchez et al. |
| 5,925,601 A | 7/1999 | McSherry et al. |
| 6,057,018 A | 5/2000 | Schmidt |
| 6,064,073 A | 5/2000 | Hoogenraad et al. |
| 6,080,489 A | 6/2000 | Mehta |
| 6,114,036 A | 9/2000 | Rinehart et al. |
| 6,137,058 A | 10/2000 | Moe et al. |
| 6,146,699 A | 11/2000 | Bonicel et al. |
| 6,159,617 A | 12/2000 | Foster et al. |
| 6,160,940 A | 12/2000 | Summers et al. |
| 6,179,665 B1 | 1/2001 | Rossman et al. |
| 6,188,026 B1 | 2/2001 | Cope et al. |
| 6,228,495 B1 | 5/2001 | Lupia et al. |
| 6,270,849 B1 | 8/2001 | Popoola et al. |
| 6,281,431 B1 | 8/2001 | Cumley |
| 6,327,841 B1 | 12/2001 | Bertini et al. |
| 6,347,561 B2 | 2/2002 | Uneme et al. |
| 6,395,989 B2 | 5/2002 | Lecoeuvre et al. |
| 6,416,813 B1 | 7/2002 | Valls Prats et al. |
| 6,418,704 B2 | 7/2002 | Bertini et al. |
| 6,461,730 B1 | 10/2002 | Bachmann et al. |
| 6,474,057 B2 | 11/2002 | Bertini et al. |
| 6,534,717 B2 | 3/2003 | Suzuki et al. |
| 6,640,533 B2 | 11/2003 | Bertini et al. |
| 6,646,205 B2 | 11/2003 | Hase et al. |
| 6,810,188 B1 | 10/2004 | Suzuki et al. |
| 6,850,681 B2 | 2/2005 | Lepont et al. |
| 6,903,264 B2 | 6/2005 | Watanabe et al. |
| 6,906,258 B2 | 6/2005 | Hirai et al. |
| 6,977,280 B2 | 12/2005 | Lee et al. |
| 7,053,308 B2 | 5/2006 | Prats et al. |
| 7,136,556 B2 * | 11/2006 | Brown et al. | 385/102 |
| 7,144,952 B1 | 12/2006 | Court et al. |
| 7,411,129 B2 | 8/2008 | Kummer et al. |
| 7,557,301 B2 | 7/2009 | Kummer et al. |
| 7,749,024 B2 | 7/2010 | Chambers et al. |
| 8,043,119 B2 | 10/2011 | Kummer et al. |
| 2002/0002221 A1 * | 1/2002 | Lee | 524/93 |
| 2002/0010252 A1 | 1/2002 | Lecoeuvre et al. |
| 2002/0043391 A1 | 4/2002 | Suzuki et al. |
| 2003/0098176 A1 | 5/2003 | Mesaki et al. |
| 2003/0195279 A1 | 10/2003 | Shah et al. |
| 2004/0001682 A1 | 1/2004 | Beuth et al. |
| 2004/0007308 A1 | 1/2004 | Houston et al. |
| 2004/0198909 A1 | 10/2004 | Breitscheidel et al. |
| 2004/0254299 A1 | 12/2004 | Lee et al. |
| 2005/0019353 A1 | 1/2005 | Prinz et al. |
| 2005/0023029 A1 * | 2/2005 | Mammeri et al. | 174/121 A |
| 2005/0036753 A1 | 2/2005 | Will et al. |
| 2005/0180725 A1 | 8/2005 | Carlson et al. |
| 2006/0065428 A1 | 3/2006 | Kummer et al. |
| 2006/0065430 A1 | 3/2006 | Kummer et al. |
| 2007/0098340 A1 | 5/2007 | Lee et al. |
| 2007/0243761 A1 * | 10/2007 | Chambers et al. | 439/587 |
| 2008/0317990 A1 * | 12/2008 | Runyan et al. | 428/36.9 |
| 2010/0230134 A1 | 9/2010 | Chambers et al. |

FOREIGN PATENT DOCUMENTS

| | | |
|---|---|---|
| DE | 44 10 456 A1 | 9/1995 |
| EP | 0 283 132 A2 | 9/1988 |
| EP | 0364717 A1 | 4/1990 |
| EP | 0544 411 A1 | 6/1993 |
| EP | 1 524 294 A1 | 4/2005 |
| FR | 2 674 364 | 9/1992 |
| FR | 2674364 | 9/1992 |
| IN | 9500996 | 3/2010 |
| JP | 59159708 A | 9/1984 |
| JP | 61076409 A | 4/1986 |
| JP | U1986076409 | 5/1986 |
| JP | S61-133506 A | 6/1986 |
| JP | S61-133507 A | 6/1986 |
| JP | 63094503 U | 6/1988 |
| JP | 01110013 A | 4/1989 |
| JP | 01144504 A | 6/1989 |
| JP | 01166410 A | 6/1989 |
| JP | 01307110 A | 12/1989 |
| JP | 05266720 A | 10/1993 |
| JP | 06057145 A | 3/1994 |
| JP | H07134913 A | 5/1995 |
| JP | 09045143 A | 2/1997 |
| JP | H09180558 A | 7/1997 |
| JP | 09251811 A | 9/1997 |
| JP | 10012051 A | 1/1998 |
| JP | 10086207 | 4/1998 |
| JP | 2000120922 A | 4/2000 |
| JP | 2001052536 A | 2/2001 |
| JP | 2001256836 A | 9/2001 |
| JP | 2002231065 A | 8/2002 |
| JP | 200126401 A | 11/2002 |
| JP | 2001264601 | 11/2002 |

(56) References Cited

FOREIGN PATENT DOCUMENTS

| JP | 2002324438 A | 11/2002 | |
|---|---|---|---|
| JP | 2003323820 A | 11/2003 | |
| WO | WO-89/00763 | 1/1989 | |
| WO | WO 9108262 A2 * | 6/1991 | ............. C08L 43/04 |
| WO | WO-00/40653 A1 | 7/2000 | |
| WO | WO 0040653 | 7/2000 | |
| WO | WO-01/81969 A1 | 11/2001 | |
| WO | WO-01/90230 A1 | 11/2001 | |
| WO | WO-2005042226 A1 | 5/2005 | |
| WO | WO-2006016896 A1 | 2/2006 | |
| WO | WO-2007/084745 A2 | 7/2007 | |

OTHER PUBLICATIONS

International Search Report Mailed May 17, 2010 from WO 2010/107932 (International App. No. PCT/US2010/027684).

Wiles, John, "Clarifying Confusing Cables," Home Power #66, Aug./Sep. 1998.

Cerro Wire, Inc.; Introduction Portion of Request for Inter Partes Reexamination Under 35 U.S.C. §§311-318 (Control No. 95/000,594); Nov. 17, 2010; pp. 1-37 (US).

Cerro Wire, Inc.; Exhibit W-1-W-38 (Claim Charts), Request for Inter Partes Reexamination Under 35 U.S.C. §§311-318 (Control No. 95/000,594); Nov. 17, 2010; pp. 1-1023 (US).

Encore Wire, Inc.; Introduction Portion of Corrected Request for Inter Partes Reexamination Under 35 U.S.C. §§1.193 (Control No. 95/000,573); Oct. 8, 2010; pp. 1-74 (US).

Encore Wire, Inc.; Exhibits 1-9 (Claim Charts) of Corrected Request for Inter Partes Reexamination Under 35 U.S.C. §§1.193 (Control No. 95/000,573); Oct. 8, 2010; pp. 1-137 (US).

United States Patent and Trademark Office; Office Action in Inter Partes Reexamination of U.S. 7,749,024 (U.S. Appl. No. 95/000,573), Dec. 3, 2010, 12 pages (US).

United States Patent and Trademark Office; Office Action in Inter Partes Reexamination of U.S. 7,749,024 (U.S. Appl. No. 95/000,594), Feb. 11, 2011, 25 pages (US).

United States Patent and Trademark Office; Response to Office Action in Inter Partes Reexamination of U.S. 7,749,024 (U.S. Appl. No. 95/000,573), Feb. 3, 2011, 1-17 pages (US).

United States Patent and Trademark Office; Response to Office Action in Inter Partes Reexamination of U.S. 7,749,024 (U.S. Appl. No. 95/000,594), Apr. 11, 2011, 1-35 pages (US).

United States Patent and Trademark Office, Office Action in U.S. Appl. No. 11/858,766, Jun. 9, 2008, 8 pp (US).

Dow Corning presentation entitled "MBs to Improve CoF—Injection Moulding & Extrusion"; from filed entitled "DC (multibase) Masterbatch training 2004.ppt"; date uncertain; 8 pages (US).

Howard & Howard letter to Mr. Thomas C. Wright dated Feb. 7, 2008 regarding U.S. Appl. No. 11/675,441 (2pp) (US).

Dow Corning Product Information sheet re Dow Corning MB50-011 composition, (4pp) (US).

Dow Corning Product Information sheet re Dow Corning MB50-321 composition, Jan. 15, 2001 (2pp) (http://www.dowcorning.com).

Dow Corning Product Information sheet re Dow Corning MB25-504 composition, Jan. 2, 2002 (4pp) (http://www.dowcorning.com).

Dow Corning Product Information sheet re Dow Corning MB40-006 composition, Mar. 4, 2008 (1p) (http://www.dowcorning.com).

Dow Corning Product Information sheet re Dow Corning MB50-002 composition, Jan. 15, 2001 (4pp) (http://www.dowcorning.com).

Dow Corning Product Information sheet re Dow Corning MB50-320 composition, Mar. 4, 2008 (1p) (http://www.dowcorning.com).

Dow Corning Product Information sheet re Dow Corning MB50-004 composition, Jan. 15, 2001 (4pp) (http://www.dowcorning.com).

Dow Corning Product Information sheet re Dow Corning MB50-008 composition, Mar. 4, 2008 (1pp) (http://www.dowcorning.com).

Dow Corning Product Information sheet re Dow Corning MB50-010 composition, Jan. 16, 2001 (2pp) (http://www.dowcorning.com).

Dow Corning Product Information sheet re Dow Corning MB50-011 composition, Mar. 4, 2008 (1pp) (http://www.dowcorning.com).

Dow Corning Product Information sheets re Dow Corning MB50-313 and MB50-314 composition, Jan. 15, 2001 (4pp) (http://www.dowcorning.com).

Dow Corning article "Siloxane additive minimizes friction in fibre optic cable conduit", 2001 (2pp) (http://www.dowcorning.com).

Crompton Corporation brochure on Amides (approx. 2003) (27pp).

Axel Plastics Research Laboratories, Inc., Product Data Sheet re "Mold Wiz, INT-33PA" (Approx. 2000) (1p).

Axel Plastics Research Laboratories, Inc., Product Data Sheet re "Mold Wiz, INT-40DHT" (Approx. 2001) (1p).

Axel Plastics Research Laboratories, Inc., Product Data Sheet re "Mold Wiz, INT-40GHT" (Approx. 2001) (1p).

E.I. Du Pont De Nemours and Company, Flyer entitled "Teflon", (Aug. 14, 2003) (1p) (http://www.dupont.com).

General Electric Company, Brochure entitled "GE Silicones-Fluids, Emulsions & Specialties", (2001) (19pp).

Witco Corporation, Brochure entitled "Fatty Acids, Glycerine, Triglycerides", (1997) (22pp).

Crompton Corporation, Brochure entitled "Vinyl Additives Product Guide", (2002) (16pp).

United States Patent and Trademark Office, Office Action in U.S. Appl. No. 11/675,441, Dec. 28, 2007 (4pp).

United States Patent and Trademark Office, Office Action in U.S. Appl. No. 11/313,596, Mar. 20, 2007 (14pp).

United States Patent and Trademark Office, Office Action in U.S. Appl. No. 11/120,487, Nov. 2, 2005 (5pp).

United States Patent and Trademark Office, Office Action in U.S. Appl. No. 11/120,487, Jun. 8, 2006 (13pp).

United States Patent and Trademark Office, Office Action in U.S. Appl. No. 11/135,807, Dec. 15, 2005 (9pp).

United States Patent and Trademark Office, Office Action in U.S. Appl. No. 11/135,807, Jun. 8, 2006 (13pp).

Richard E. Marquis, Adam J. Maltby; An Introduction to Fatty Acid Amid Slip and Anti-Blocking Agents; Polymer, Laminations & Coatings Conf., Aug. 30, 1998; pp. 942-952 (US).

J.B. Decoste; Friction of Vinyl Chloride Plastics; Society of Plastics Engineers Journal, vol. 25, Oct. 1969; pp. 67-71; Robert D. Forger (publisher), Manchester, NH (US).

Cerro Wire, Inc.; Request for Inter Partes Reexamination Under 35 U.S.C. §§311-318 (USPTO); Sep. 26, 2008; pp. 1-90 (US).

Southwire Company; Response to Request for Inter Partes Reexamination (USPTO); Oct. 21, 2008; pp. 1-27 (US).

United States Patent and Trademark Office; Office Action in U.S. Appl. No. 11/675,441; Oct. 6, 2008, 6 pages (US).

*Southwire Company v. Cerro Wire, Inc.*; Complaint for Patent Infringement and Demand for Jury Trial (with Exhibit A), Civil Action No. 3:08-CV-092-JTC, U.S.D.C.; Northern District of Georgia; Newnan Division; Aug. 12, 2008; 16 pp (US).

*Southwire Company v. Cerro Wire, Inc.*; Answer to Complaint for Patent Infringement and Demand for Jury Trial; Civil Action No. 3:08-CV-092-JTC; U.S.D.C.; Northern District of Georgia; Newnan Division; Oct. 16, 2008; 8 pp (US).

*Southwire Company v. Cerro Wire, Inc.*; Southwire Company's Motion, Memorandum and [Proposed] Order to Dismiss Cerro Wire Inc.'s Defenses of Invalidity Under 35 U.S.C. 102 and 103; Civil Action No. 3:08-CV-092-JTC; U.S.D.C.; Northern District of Georgia; Newnan Division; Jan. 2, 2009; 19 pp (US).

*Southwire Company v. Cerro Wire, Inc.*; Defendant Cerro Wire Inc.'s Motion to Stay Pending Reexamination of the Patent-In-Suit; Civil Action No. 3:08-CV-092-JTC; U.S.D.C.; Northern District of Georgia; Newnan Division; Dec. 12, 2008; 11 pp (US).

*Southwire Company v. Cerro Wire, Inc.*; Southwire's Opposition to Defendant's Motion for Stay Pending Reexamination of the Patent-In-Suit (with Declarations of Winn Wise and Holly S. Hawkins); Civil Action No. 3:08-CV-092-JTC; U.S.D.C.; Northern District of Georgia; Newnan Division; Jan. 2, 2009; 75 pp (US).

*Southwire Company v. Cerro Wire, Inc.*; Defendant Cerro Wire's Reply Memorandum in Support of its Motion to Stay Pending Reexamination of the Patent-In-Suit; Civil Action No. 3:08-CV-092-JTC; U.S.D.C.; Northern District of Georgia; Newnan Division; Jan. 16, 2009; 17 pp (US).

*Southwire Company v. Cerro Wire, Inc.*; Defendant Cerro Wire, Inc.'s Response to Plaintiffs Motion to Dismiss Cerro's Invalidity Defenses

(56) References Cited

OTHER PUBLICATIONS

Under 35 U.S.C. 102 and 103; Civil Action No. 3:08-CV-092-JTC; U.S.D.C.; Northern District of Georgia; Newnan Division; Jan. 16, 2009; 7 pp (US).

*Southwire Company* v. *Cerro Wire, Inc.*; Southwire Company's Reply in Support of its Motion to Dismiss Cerro Wire Inc.'s Defenses of Invalidity Under 35 U.S.C. 102 and 103 and Further Opposition to Cerro Wire, Inc.'s Motion for Stay Pending Reexamination of the Patent-In-Suit; Civil Action No. 3:08-CV-092-JTC; U.S.D.C.; Northern District of Georgia; Newnan Division; Jan. 26, 2009; 16 pp (US).

U.S. Appl. No. 60/544,224, filed Feb. 12, 2004, Carlson et al., 3 pp.
United States Patent and Trademark Office, Office Action in U.S. Appl. No. 10/952,294, Mar. 14, 2007, 10 pp (US).
United States Patent and Trademark Office, Office Action in U.S. Appl. No. 10/952,294, Mar. 4, 2008, 6 pp (US).
United States Patent and Trademark Office, Office Action in U.S. Appl. No. 10/952,294, Jul. 12, 2006, 13 pp (US).
United States Patent and Trademark Office, Office Action in U.S. Appl. No. 10/952,294, Aug. 7, 2007, 11 pp (US).
United States Patent and Trademark Office, Office Action in U.S. Appl. No. 12/017,222, Aug. 7, 2008, 8 pp (US).
United States Patent and Trademark Office, Office Action in U.S. Appl. No. 11/858,766, Feb. 9, 2009, 11 pp (US).
United States Patent and Trademark Office, Notice of Allowance in U.S. Appl. No. 12/017,222, Dec. 5, 2008 (12 pp).
United States Patent and Trademark Office, Notice of Allowance in U.S. Appl. No. 12/017,222, Jan. 8, 2009 (11 pp).
United States Patent and Trademark Office, Notice of Allowance in U.S. Appl. No. 12/017,222, Feb. 27, 2009 (8 pp).

*Southwire Company* vs. *Cerro Wire, Inc.*; Court Order Granting Stay of Litigation pending USPTO's Reexamination of U.S. Patent No. 7,411,129, Civil Action No. 3:08-CV-092-JTC; U.S.D.C.; Northern District of Georgia, Newnan Division, May 12, 2009, 13 pp. (US).

Extended European Search Report for European Application No. EP 06739714.1, dated Nov. 12, 2009.
International Search Report and Written Opinion Mailed Aug. 21, 2006 from WO 2007/81372 (International App. No. PCT/US06/11069).
International Search Report Mailed Oct. 20, 2006 from WO 2006/127711 (International App. No. PCT/US06/19923).
International Search Report Mailed Dec. 20, 2005 from WO 2006/16895 (International App. No. PCT/US05/05165).
United States Patent and Trademark Office; Office Action in Inter Partes Reexamination of U.S. 7,411,129 (U.S. Appl. No. 95/000,403), Dec. 5, 2008, 26 pages (US).
Dow Corning Product Information sheet re Dow Corning MB50-001 composition, Jan. 15, 2001 (6pp) (http://www.dowcorning.com).
Examination Report for New Zealand Application No. 564551, dated Aug. 14, 2009.

*Southwire Company* v. *Encore Wire Corporation and Cerro Wire, Inc.*; Southwire Company's Answer to Encore Wire Corporation's First Amended Answer, Affirmative Defenses, and Counterclaims, Civil Action No. 6:09-cv-289-LED; U.S.D.C. For the Eastern District of Texas, Tyler Division, Feb. 12, 2010, 17 pp. (US).

Office Action for Co-Pending Patent Application No. 88656 in Panama Issued Oct. 6, 2011, 2 pgs.
Cerro Wire, Inc.; Request for Ex Parte Reexamination Under 35 U.S.C. §§311-318 (USPTO); Oct. 1, 2009; 359 pages.

Encore Wire Corporation; Request for Ex Parte Reexamination Statements Under 35 U.S.C. §§1.150(b)(1) and 1.150(b)(2) (USPTO); Nov. 17, 2009; 44 pages.
Kaufman, et al., "A PVC jacket compound with improved flame retardancy and superior physical properties", Wire Technology, pp. 44-50, 7/8:75, (paper presented at the 23rd international Wire & Cable Symposium in Atlantic City, Dec. 1974), 7 pgs.
Ryan, et al., "Ultra-High-Molecular-Weight Functional Siloxane Additives in Polymers. Effects on Processing and Properties," Vinyl & Additive Technology, Mar. 2000, vol. 6, No. 1 (Mar. 2000), 13 pgs.
ultra-XTM, Une nouvelle dimension dans les cables NMD-7, ultra-X product brochure, Northern Telecom—Power Cable Division, Apr. 11, 1977, 28 pgs.
Underwriters Laboratories Inc. Standard for Safety UL-719 for Nonmetallic-Sheathed Cables, Eleventh Edition (Mar. 21, 2002), 46 pgs.
United States Patent and Trademark Office; Response to Action Closing Proceeding in Inter Partes Reexamination of U.S. 7,749,024 (U.S. Appl. No. 95/000,573), Filed Aug. 15, 2012, 27 pages (US).
United States Patent and Trademark Office; Response to Office Action in Inter Partes Reexamination of U.S. 7,749,024 (U.S. Appl. No. 95/000,594), Filed Sep. 10, 2012, 67 pages (US).
United States Patent and Trademark Office; Right of Appeal Notice in Inter Partes Reexamination of U.S. 7,749,024 (U.S. Appl. No. 95/000,573), Sep. 28, 2012, 53 pages (US).
United States Patent and Trademark Office; Right of Appeal Notice in Inter Partes Reexamination of U.S. 7,749,024 (U.S. Appl. No. 95/000,594), Oct. 25, 2012, 162 pages (US).
Abstract of Abstract of FR 2674364, Sep. 25, 1992, 3 pgs.
Abstract of JP 01-144504, Patent Abstracts of Japan, Jun. 6, 1989, 1 pg.
Abstract of JP 2002231065, Patent Abstracts of Japan, and machine translation, Aug. 16, 2002, 12 pgs.
Dow Corning, Dow Corning MB50-011 Masterbatch.
J.B. Decoste; Friction of Vinyl Chloride Plastics; SPE Journal, Oct. 1969.
Wild, "The Effects of Silicone Polymer Additions on the Processing and Properties of an Isotactic Propylene Homopolymer".
H. Domininghaus, "Les Matieres plastiques les plus usuelles," Informations Chimie n° 158, p. 179-194, 1976.
J.P. Trotignon, et al., "Extrusion des Thermoplastiques," In "Matieres Plastiques," Editons Nathan, 1996, p. 148.
Opposition to European Patent EP 1899988 and accompanying documentation, filed with EPO on Oct. 22, 2013, received Oct. 29, 2013, (23 pgs).
Polywater® J specification, American Polywater Corporation, 4 pgs., Aug. 2010.
Thermoplastic-Insulated Wires and Cables, UL 83, in CSA Standards Update Service, Thirteenth Edition, Nov. 15, 2003, 186 pgs.
Translation of Submission of Oct. 22, 2013 from IPSILON to the EPO; Re: Opposition to European Patent EP 1899988, received Oct. 29, 2013, (21 pgs).
UL Standard for Safety for Nonmetallic-Sheathed Cables, UL 719, Twelfth Edition, Feb. 9, 2006.
Yellow 77® document, Ideal Industries GmbH, 1 pg., 2003.
Office Action for Japanese Patent Application No. 2008-513468, mailed Jul. 22, 2014, 5 pgs.
Translation of Office Action for Japanese Patent Application No. 2008-513468, mailed Jul. 22, 2014, 12 pgs.

\* cited by examiner

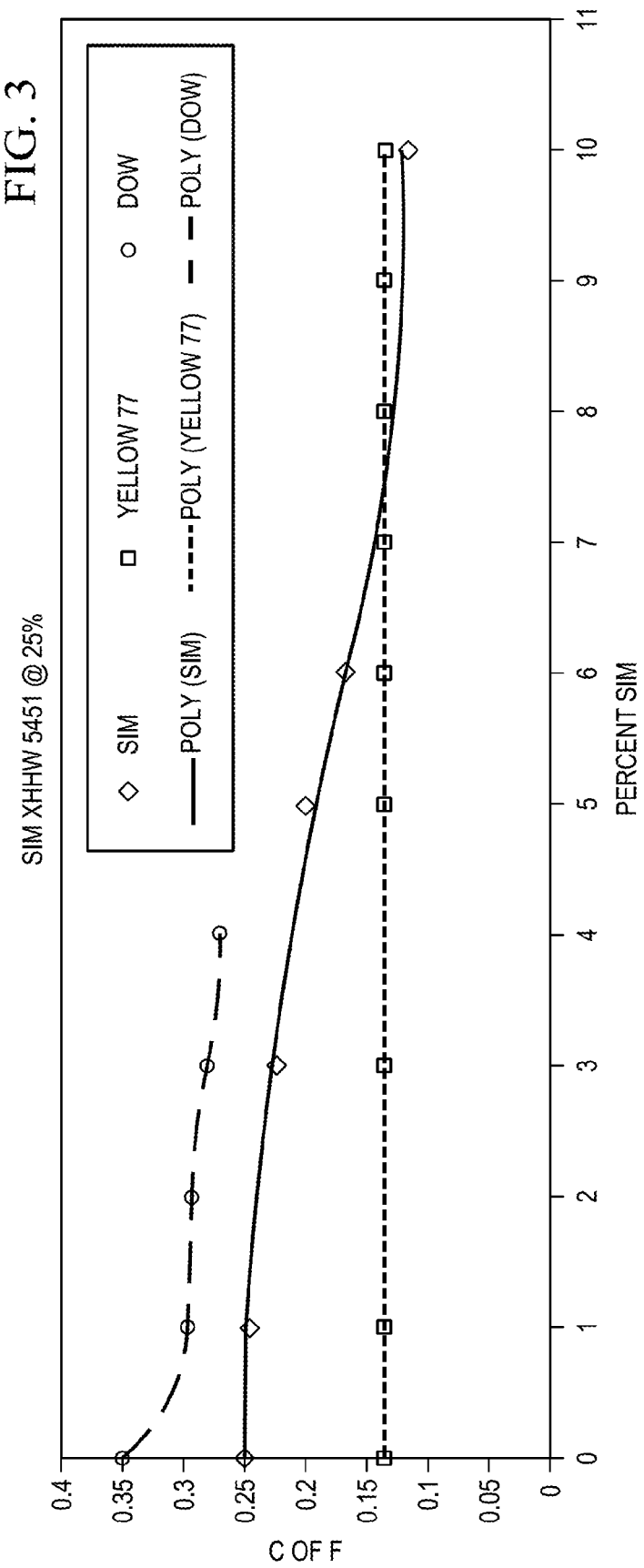

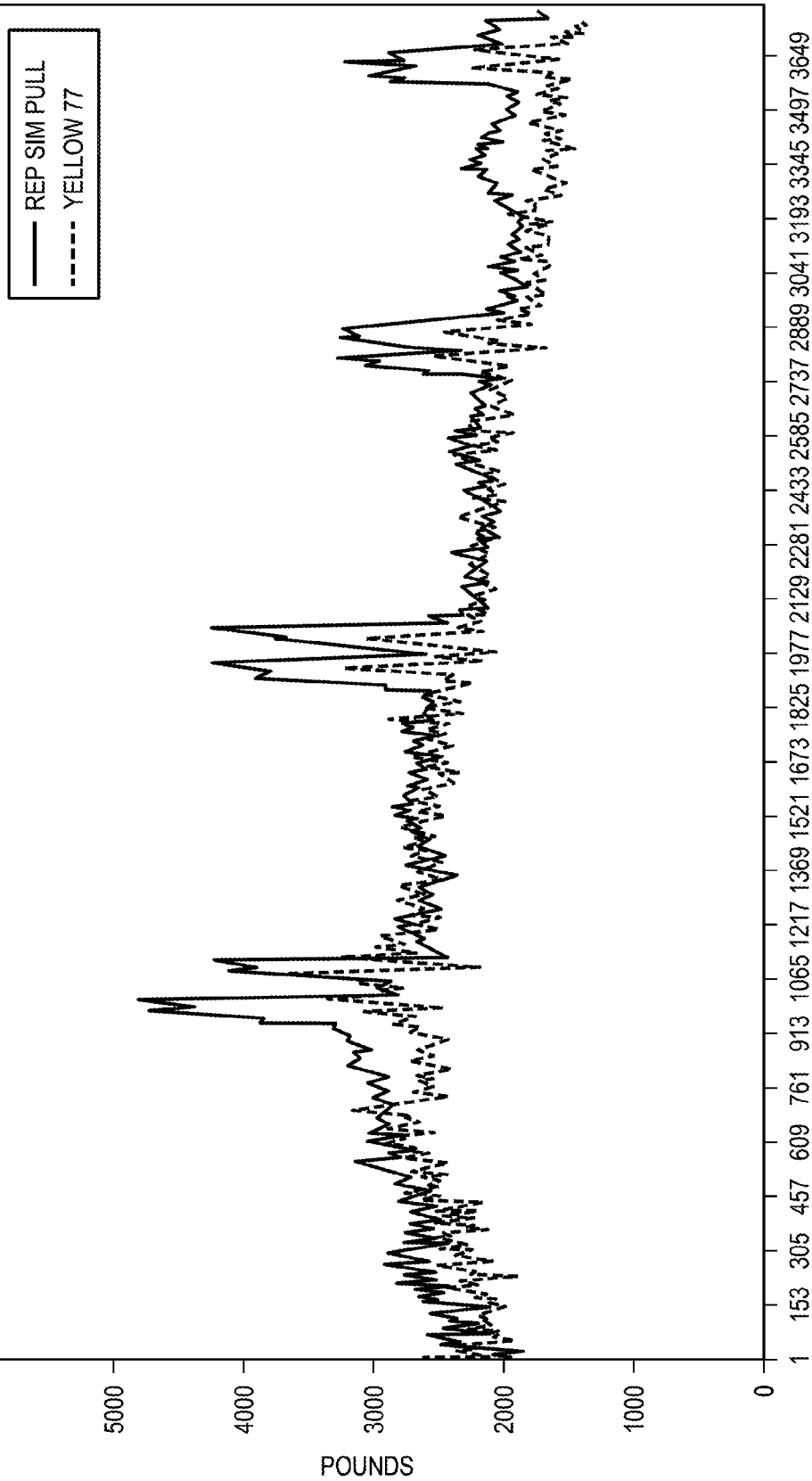

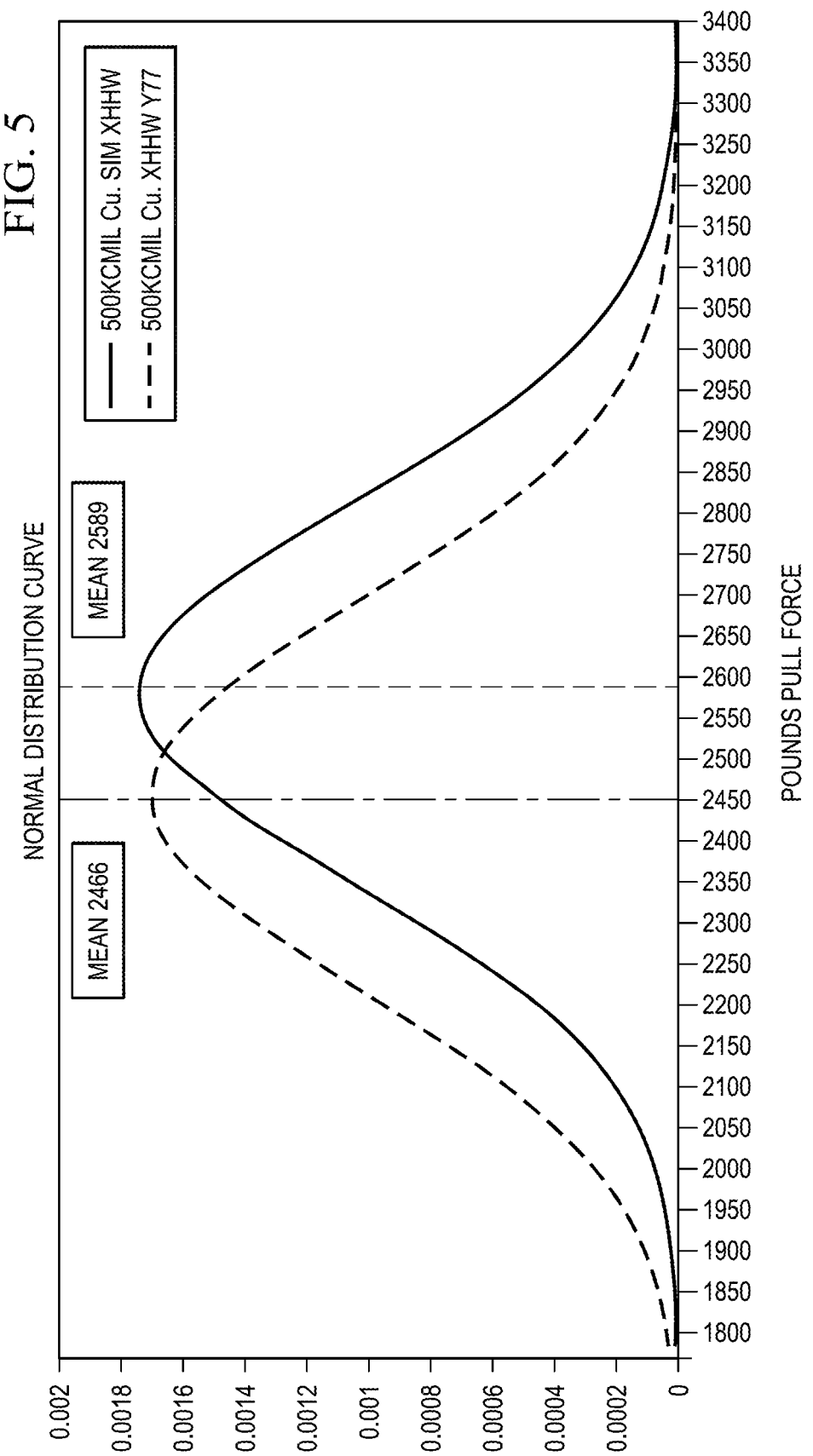

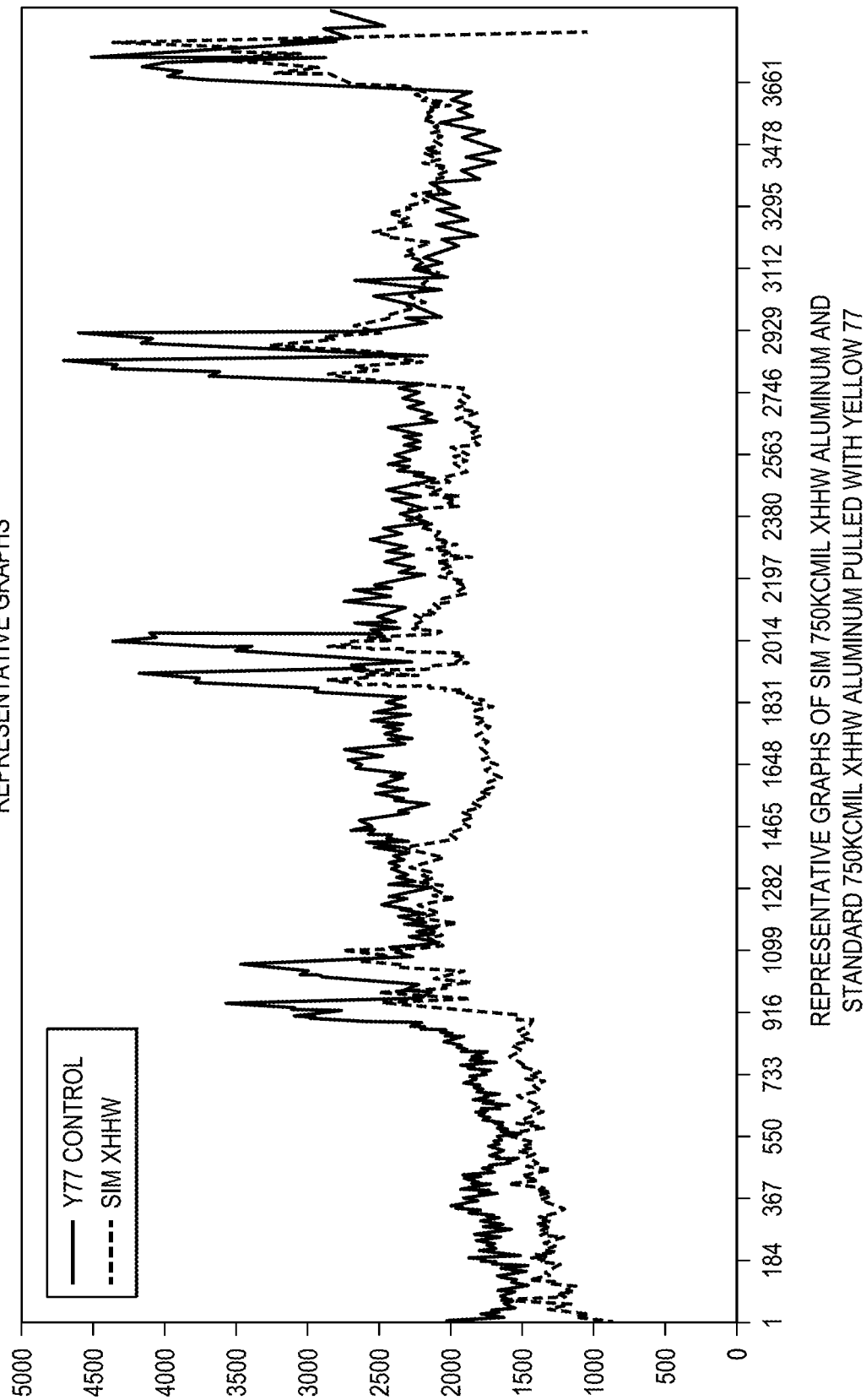

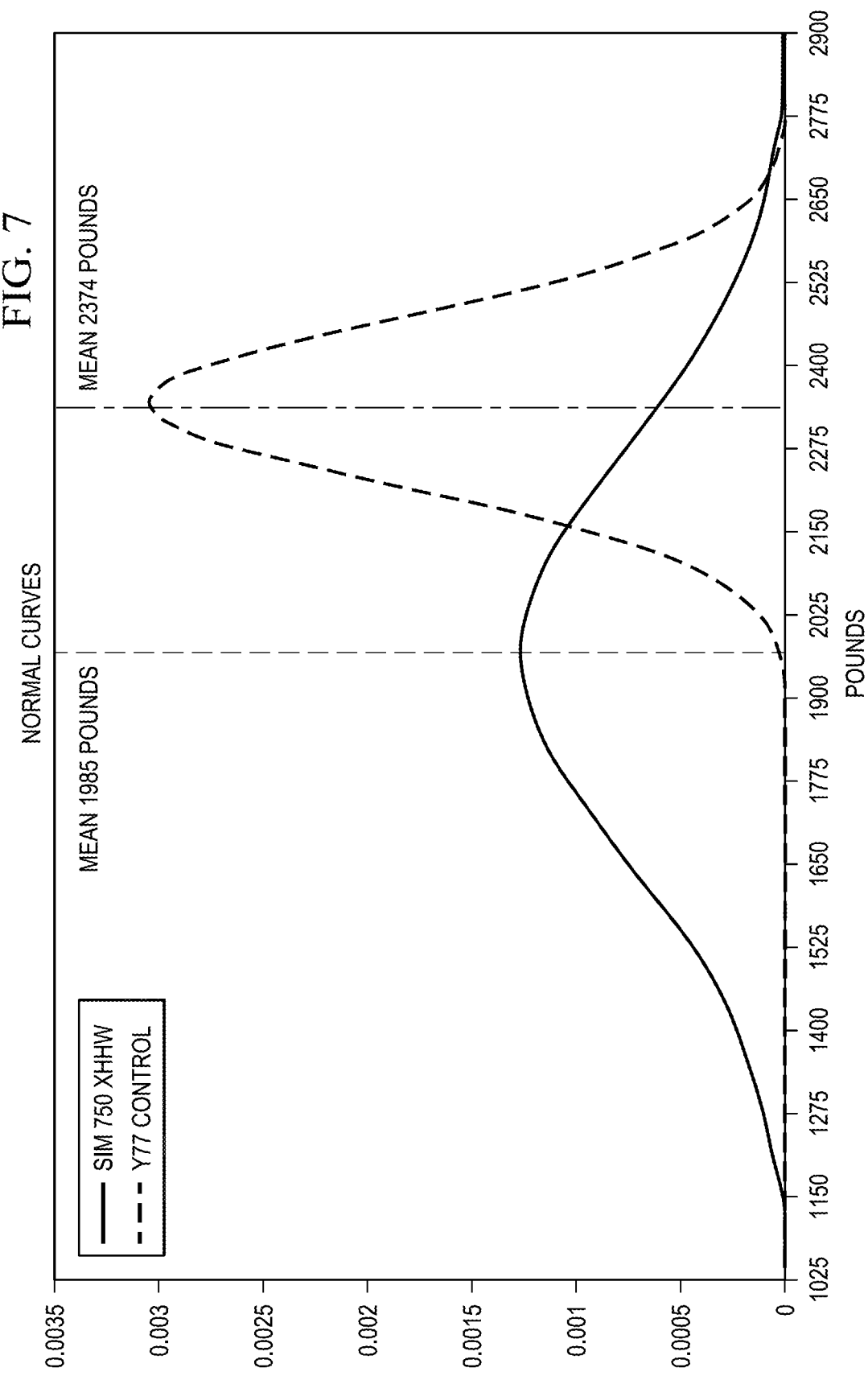

ELECTRICAL CABLE HAVING CROSSLINKED INSULATION WITH INTERNAL PULLING LUBRICANT

FIELD OF THE INVENTION

The present invention relates to electrical power cables having crosslinked insulation, more particularly to methods for reducing the installation pulling force of electrical cables having crosslinked insulation, and even more particularly to preferred pulling lubricant compositions for effecting such reduction.

BACKGROUND OF THE INVENTION

Electrical power cables typically include a conductor core and an outer jacket or sheath. The "conductor core", as used herein and throughout the specification and claims, may be, for example, a single metal wire, multiple small wires twisted together to make a "stranded" cable, multiple insulated wires, or other types of electrical conductors acting together to serve a particular power function (e.g., three-phase connection). The term "sheath," as used herein and throughout the specification and claims, means the outermost covering surrounding the conductor core, whether of a single type material or multiple layers of the same or different material. The sheath may comprise one or more layers of polymeric or other material to provide physical, mechanical, electrical insulating and/or chemical protection for the underlying cable components. Crosslinked polymers such as crosslinked polyethylene (XLPE) are used as electrical insulation layers or jackets for various electrical power cable types such as type XHHW, type RHH/RHW, and type USE cables.

Installation of electrical power cable often requires that it be pulled through tight spaces or small openings in, and in engagement with, narrow conduits, raceways, cabletrays, or passageways in rafters or joists. This becomes problematic since the exterior surface of the cable sheath normally has a multitude of forces acting on it, therefore requiring a large pulling force. Moreover, installation parameters include maximum allowable cable pulling tension and/or sidewall pressure limits. Exceeding these limits can result in degradation of the cable, physical damage and inferior installation.

To overcome this problem, the general industry practice has been to coat the exterior surface of the cable sheath with a lubricant at the job site in order to reduce the coefficient of friction between this surface and the conduit walls or like surfaces, typically using vaselines or lubricants produced specifically for such purpose, such as Yellow 77® (hereinafter, "Y 77"). However, applying a lubricant like Y 77 to the finished cable at the job site poses problems, principally the additional time, expense and manpower required to lubricate the finished cable surface at the job site as well as to clean up after the lubricating process is completed.

Alternative solutions have been proposed, including the application of a separate lubricant layer after the polymeric sheath has been formed or extruded during the manufacturing of the cable, or the application of granules of material to the still-hot sheath during the extrusion process, which granules are designed to become detached when the cable is pulled through the duct. These solutions not only require major alterations of the manufacturing line, but result in a loss in manufacturing time, increased economic costs, and undesirable fluctuations in the geometrical dimensions of the cable sheaths. Other proposed solutions have involved spraying, dipping, or otherwise externally applying a "pulling" lubricant to the exterior surface of the sheath, but these techniques have not been satisfactory for all conditions of service.

As a result, a major breakthrough in this area has been the development of an innovative process by which a preselected pulling lubricant, of appropriate type and sufficiency, is internally introduced during the cable manufacture into the material that is to form the sheath, so that the pulling lubricant, either by migration through, or permeation throughout, the sheath becomes available at the exterior surface of the cable sheath at the time of the cable's installation, and is effective to reduce the amount of force required to install the cable. This process is described in U.S. Pat. No. 7,411,129, assigned to the assignee of the present invention, and is incorporated herein by reference in its entirety. The hereindescribed invention is a specific improvement to such process, as applied to crosslinked insulation of the sheath.

It is important to an understanding of the present invention to know the difference between what are referred to as "pulling lubricants" and what are "processing lubricants." A pulling lubricant is a lubricant that appears at the outside surface of the sheath of the cable and is effective to reduce the force necessary to install the cable through building conduits and the like. A processing lubricant is lubricating material that is used to facilitate the cable manufacturing process, such as improving the flow of polymer chains during any polymer compounding as well as during the extrusion processes while the polymer is in its molten or melt phase. Cable manufacturers have long used processing lubricants, such as stearic acid or ethylene bis-stearamide wax, as a minor component of the polymeric compound from which the cable sheath is formed. Because a processing lubricant is normally not effective except when the polymer is in this melt phase, the effect of a processing lubricant as an external lubricant is essentially non-existent in the final hardened polymer sheath of the cable. Even where there may be an excessive amount of the processing lubricant, a separate pulling lubricant would still be required to sufficiently reduce the cable sheaths' exterior surface coefficient of friction as well as minimize the pulling force necessary to install the cable.

Accordingly, there has been a long-felt need for an effective method of providing a pulling lubricant at the exterior surface of finished power cables having insulation formed of crosslinked polymeric material, in which the pulling lubricant is effective to reduce the required installation pulling force.

SUMMARY OF THE INVENTION

As a consequence, this invention is directed to the use of certain pulling lubricants in electrical cable sheaths containing crosslinked polymers such as polyethylene. One embodiment of the invention provides a crosslinkable silane-ethylene copolymer impregnated with an effective amount of pulling lubricant, wherein the pulling lubricant does not deleteriously interfere with the subsequent crosslinking of the base polymer, and in the finished electrical cable, the pulling lubricant is available at the surface of the outer sheath of the electrical cable to reduce the cable sheath's exterior surface coefficient of friction and reduce the pulling force necessary to install the cable at the time of the cable's installation. The pulling lubricant generally is a high viscosity silicone, preferably polydimethylsiloxane, or a fatty acid amide such as erucamide or oleamide, and is present in an amount in the range of from about 2 to about 15% by weight, based on the total weight of the outer sheath.

In another embodiment, a method of forming a crosslinked polyethylene sheath for an electrical cable is provided, such method including (1) blending a crosslinkable polyethylene resin or ethylene copolymer with a silicone or fatty acid amide to form a blend, (2) processing the blend into a shape of a sheath for an electrical cable and (3) crosslinking the blend to form the crosslinked polyethylene sheath. The silicone or fatty acid amide is present in an amount in the range of from about 2 to about 15 weight percent, based on the total weight of the crosslinked polyethylene sheath.

As described in more detail below, the methods of this invention include introducing a pulling lubricant, of optimum weight percentage or quantity, into the manufacturing process at a particular stage of manufacture, which results in the pulling lubricant being present in the outer sheath, so that it is available to reduce the cable sheaths' exterior surface coefficient of friction and to minimize the pulling force necessary to install the cable. In theory, this is as a consequence of the migration of the pulling lubricant to the sheath surface; or alternatively, due to the permeation of the pulling lubricant throughout the sheath, depending upon the particular compositions.

As described in detail below, a crosslinked polyethylene sheath of a finished power cable is produced by the described method.

BRIEF DESCRIPTION OF THE DRAWINGS

These and other details and aspects of the invention, as well as the advantages thereof, will be more readily understood and appreciated by those skilled in the art from the following detailed description, taken in conjunction with the accompanying drawings, in which:

FIG. 3 is a graphical representation of test data obtained from the test device in FIG. 2 which compares the coefficient of friction of different XHHW cables incorporating varying amounts of pulling lubricant.

FIGS. 4-7 are graphical representations of test data obtained from a large scale test device and which compare the required pulling force of different XHHW cables incorporating varying amounts of pulling lubricant.

DETAILED DESCRIPTION OF THE INVENTION

Composition

Figure 1:
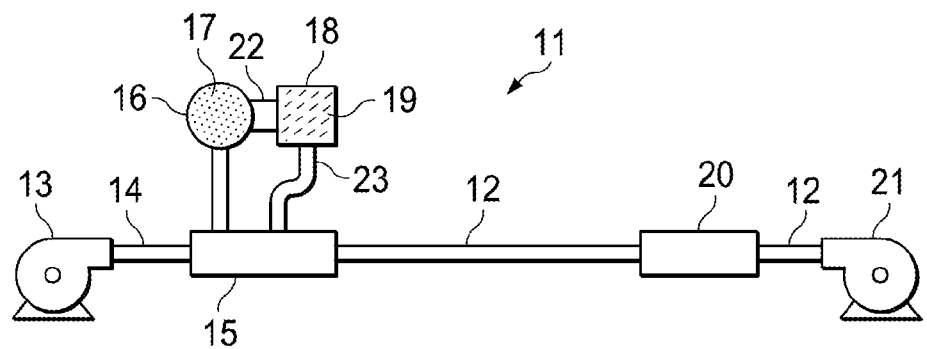
FIG. 1 is a diagrammatic representation of typical equipment used in the manufacture of cable in accordance with the present invention, when mixing the pulling lubricant with the crosslinkable polyethylene material prior to extrusion.

Polymeric materials used in compositions of the present invention include polyethylene, polypropylene, polyvinylchloride, organic polymeric thermosetting and thermoplastic resins and elastomers, polyolefins, copolymers, vinyls, olefin-vinyl copolymers, polyamides, acrylics, polyesters, fluorocarbons, and the like. Polyethylene resins useful in the present invention may include low density polyethylene, linear low density polyethylene, high density polyethylene, silane-grafted polyethylene, ethylene copolymers and combinations thereof. As previously described, for cables of the present invention, the conductor core of a single solid or stranded conductor is preferably surrounded by an insulating layer of low density crosslinked polyethylene (XLPE).

Crosslinked polyethylene (XLPE) may be produced by any method known in the art and preferably includes incorporating alkoxysilane functionality into the polymer structure either by grafting unsaturated alkoxysilanes onto the ethylene polymers or by direct copolymerization of ethylene with unsaturated alkoxysilanes. The silane-ethylene copolymer can be crosslinked, for example, by exposing the copolymer to moisture or steam in the presence of an organometallic catalyst, e.g., dibutyl-tin-dilaurate. Polyethylene resins useful in the present invention are capable of being crosslinked by a reactive unsaturated silane compound and exposure to water. Polyethylene crosslinking compounding materials are available from a number of manufacturers which supply silane pre-grafted base resins (the silane compound(s) being grafted onto the polyethylene resin by reactive extrusion) and catalyst masterbatches that can be mixed in proper proportions. For example, crosslinkable polyethylene system components are available from Padanaplast USA under the trade designation "Pexidan®" (including Pexidan® V/T, Pexidan® X/T, Pexidan® U/T, Pexidan® R/T, Pexidan® H/T and Pexidan® L/T) that include a silane pregraft (designated A-3001) and a catalyst masterbatch such as, for example, CAT-010FR, CAT-005FR, CAT-008, CAT-009, CAT-012FR, CAT-003, and CAT-047FRUV.

Alternatively, polyethylene crosslinkable compounds useful in the present invention (which may or may not be grafted or copolymerized with silane) are combined with a suitable crosslinking agent such as a heat-activated organic peroxide. The crosslinkable compounds may then be crosslinked by heat (and to a lesser extent, pressure) such as for example by steam curing. Other forms of curing also may be employed such as for example by using heated pressurized gasses such as nitrogen.

Generally, the crosslinkable polyethylene polymers are present in compositions of the present invention in an amount in the range of from about 20 to about 99 weight percent, based on the total weight of the composition, preferably in the range of from about 30 to about 85 weight percent based on the total weight of the composition, and more preferably in an amount in the range of from about 40 to about 80 weight percent, based on the total weight of the composition.

Compositions of the present invention further include a pulling lubricant in an amount sufficient to reduce the coefficient of friction of the exterior surface of the sheath/cable and reduce the required cable pulling force during the cable's installation. Useful pulling lubricants include high viscosity silicones such as, for example, polydimethylsiloxane. The preferred pulling lubricant is polydimethylsiloxane or a fatty acid amide such as erucamide or oleamide in an amount in the range of from about 2 to about 15 weight percent based on the total weight of the composition.

When incorporated into a finished electrical cable sheath, the pulling lubricant is continuously available at the surface of the sheath/cable upon installation as a consequence of the migration of the pulling lubricant to the sheath surface during installation; or alternatively, due to the permeation of the pulling lubricant throughout the sheath. Under these circumstances, the pulling lubricant is effective to reduce the installation pulling force of the electrical cable.

Compositions of the present invention may further comprise additives known in the art, such as for example, flame retardants/catalysts and color concentrates.

Preparation of Compositions

Referring initially to FIG. 1, there is depicted typical equipment 11 for manufacturing electrical cable 12 in accordance with one process of the present invention. The outer sheath of the cable is of an extruded crosslinked polymeric material such as polyethylene. The equipment 11 may include a reel 13 which supplies conductor wire 14 to an extruding head 15. In flow communication with the extrusion head is a tank 16 of crosslinkable polyethylene pellets 17. A tank 18 with the desired pulling lubricant 19 is adapted to be in flow communication with the tank 16 by way of conduit 22, thus enabling the mixing of the pulling lubricant with the pellets 17, the mixture thereafter introduced into the extruder. Alternatively, the tank may be adapted to be in fluid communication with the extruder or extrusion head 15, by way of conduit 23, downstream from the point of entry of the polyethylene material, thus allowing the pulling lubricant to mix with the polyethylene while in its molten state in the extruder or extruder head. A cooling box 20 for cooling the extruded product is provided, and a reel 21 is positioned for taking up the resulting cable assembly 12. When the final cable construction is such that there are multiple layers of sheath material, the pulling lubricant should desirably be incorporated into the outermost layer.

As is therefore evident, the pulling lubricant can be mixed with the material from which the outer sheath is to be extruded prior to extrusion or, alternatively, introduced into the extruding head for subsequent mixing with the molten extrusion material as the sheath is being formed. As a further alternative, the pulling lubricant can be initially compounded with the polymeric material of the pellets themselves in a process upstream of that depicted in FIG. 1, thereby forming lubricated polymeric pellets, thus eliminating the need for tank 18 and conduits 22 and 23.

Preferably, the pulling lubricant is incorporated into a crosslinkable polyethylene copolymer by using a masterbatch system, thereby forming a carrier for the pulling lubricant. By using a masterbatch, high concentrations of the pulling lubricant are formulated with the crosslinkable polyethylene system in such quantities as to produce an appropriate concentration of the pulling lubricant in the final mixture. Where a masterbatch is used, the concentration of pulling lubricant generally is in the range of up to about 25%, but may be higher. Aliquot parts of the masterbatch mixture may then be added to the resin system and other components in various percentages permitting a relatively uniform dispersion of the pulling lubricant in the product at appropriate levels. For example, a 25% masterbatch of pulling lubricant added as 5% of the total mixture results in a final lubricant concentration of 1.25%, and a 25% masterbatch of pulling lubricant added as 10% of the total mixture results in a final lubricant concentration of 2.5%, etc. Generally, the amount of pulling lubricant contained in the final compound mixture is in the range of from about 2 to about 15% based on the total weight of the composition.

To adjust the levels of pulling lubricant in the final mixture, a second polymeric material may be included in the mixture formulation. The second polymeric material can be the same or different as the polymeric material used as the polymer carrying the pulling lubricant. Preferably, the second polymeric material comprises a crosslinkable silane-ethylene copolymer or pre-grafted polyethylene resin. Generally, the amount of second polymeric material is in the range of from about 18 to about 80 weight percent, based on the total weight of the composition. Flame retardants, catalysts, color concentrates and other additives may also be used. If such components are used, they may be kept separate from the polymer components until the time of extrusion.

Compositions of the present invention may be prepared by kneading and blending the various components in conventional kneaders, mixers, extruders, or other commonly used compounding machines, such as a single- or twin-screw compounding extruder, Buss kneader, Banbury mixer, two-roll mill, or other heated shear-type mixers. The melted, continuous homogeneous matrix of resin, pulling lubricant, and optional other components are then extruded to form jackets or sheaths for use in electrical cables. In either single-layer, co-extrusion or tandem extrusion methods, a conductor, either solid or stranded, is first introduced into an extrusion head where the heated, melted sheath composition is introduced and applied to the circumference of the conductor in one or more layers. The total thickness of the coating will vary mainly depending on the dimensions of the conductor and compliance with appropriate industry standards. The final product is then introduced into a cooling water bath and ultimately the cooled product is wound onto reels.

Preferably, the crosslinking of the polymers takes place subsequent to the extrusion step. The crosslinking process may take place in air or in a sauna, or alternatively in steam or in an inert atmosphere. When using a heat-cure method for crosslinking, the final product upon leaving the extruder head proceeds directly into a heated, pressurized chamber (or tube) where the crosslinking takes place. Generally, the chamber or tube is at a temperature considerably higher than the extruder or head themselves. Given the reactive nature of the polymeric components and crosslinking agents, it was surprising to find that the finished cables produced with compositions of the present invention yielded a pulling lubricant continuously available at the surface of the outer sheath so that it is available to reduce the cable sheaths' exterior surface coefficient of friction in order to minimize the pulling force necessary to install the cable. Given the reactive nature of the components, it was expected that the pulling lubricant would interfere with the crosslinking process or react and crosslink itself, making it less available at the surface of the cable sheath for lubrication.

In accordance with the testing subsequently described, it has been determined that, for type XHHW, type RHH/RHW, and type USE cables specifically, high viscosity silicones, specifically polydimethylsiloxane, or a fatty acid amide such as erucamide or oleamide are preferred pulling lubricants to be incorporated in the crosslinked polyethylene sheath.

EXAMPLES

The following examples are presented to further illustrate the present invention and are not to be construed as limiting the invention.

Example I

Various cable sheath compositions were formulated in accordance with the present invention for testing as described in more detail below. As shown in Table I, a polymeric resin of crosslinkable silane-ethylene copolymer (commercially available from Dow Chemical Company under the trade designation Si-Link™ AC DFDB-5451 NT) was initially blended with a 25% concentration of high viscosity silicone (polydimethylsiloxane) to yield a carrier-impregnated resin containing various percentages of pulling lubricant in the final mixture as indicated in Table I. With respect to all samples (except V-Y), the carrier-impregnated resin was coextruded with a pre-grafted polyethylene resin (commercially available from Padanaplast USA, Inc. under the trade designation A-3001) as well as a flame retardant/catalyst (commercially available from Padanaplast USA, Inc. as CAT005FR, a mixture comprising polyethylene blended with a flame retardant and a catalyst), and a color concentrate (commercially available from Dow Chemical Company under the trade designation DFNC-0039 BK). The various sheathed samples were then cooled in a water bath prior to testing. A "control" cable was also prepared as indicated in Table I (which did not contain any pulling lubricant in the outer sheath).

TABLE I

| Sample | % Pulling Lubricant | Silane-ethylene copolymer impregnated with pulling lubricant | Standard pre-grafted polyethylene resin | Flame Retardant/ Catalyst | Color |
|---|---|---|---|---|---|
| A | 1 | 4 | 74.5 | 20 | 1.5 |
| B | 2 | 8 | 70.5 | 20 | 1.5 |
| C | 3 | 12 | 66.5 | 20 | 1.5 |
| D | 4 | 16 | 62.5 | 20 | 1.5 |
| E | 5 | 20 | 58.5 | 20 | 1.5 |
| F | 6 | 24 | 54.5 | 20 | 1.5 |
| G | 7 | 28 | 50.5 | 20 | 1.5 |
| H | 8 | 32 | 46.5 | 20 | 1.5 |
| I | 9 | 36 | 42.5 | 20 | 1.5 |
| J | 9.5 | 38 | 40.5 | 20 | 1.5 |
| K | 10 | 40 | 38.5 | 20 | 1.5 |
| L | 10.5 | 42 | 36.5 | 20 | 1.5 |
| M | 11 | 44 | 34.5 | 20 | 1.5 |
| N | 11.5 | 46 | 32.5 | 20 | 1.5 |
| O | 12 | 48 | 30.5 | 20 | 1.5 |
| P | 12.5 | 50 | 28.5 | 20 | 1.5 |
| Q | 13 | 52 | 26.5 | 20 | 1.5 |
| R | 13.5 | 54 | 24.5 | 20 | 1.5 |
| S | 14 | 56 | 22.5 | 20 | 1.5 |
| T | 14.5 | 58 | 20.5 | 20 | 1.5 |
| U | 15 | 60 | 18.5 | 20 | 1.5 |
| V+ | 1 | 4 | 74.5 | 20 | 1.5 |
| W+ | 2 | 8 | 70.5 | 20 | 1.5 |
| X+ | 3 | 12 | 66.5 | 20 | 1.5 |
| Y+ | 4 | 16 | 62.5 | 20 | 1.5 |
| Control | 0 | 0 | 78.5 | 20 | 1.5 |

*Amounts are weight percent, based on the total weight of the crosslinked polyethylene sheath.
+Ethylene copolymer only.

Example II

Coefficient of Friction Test

Figure 2:
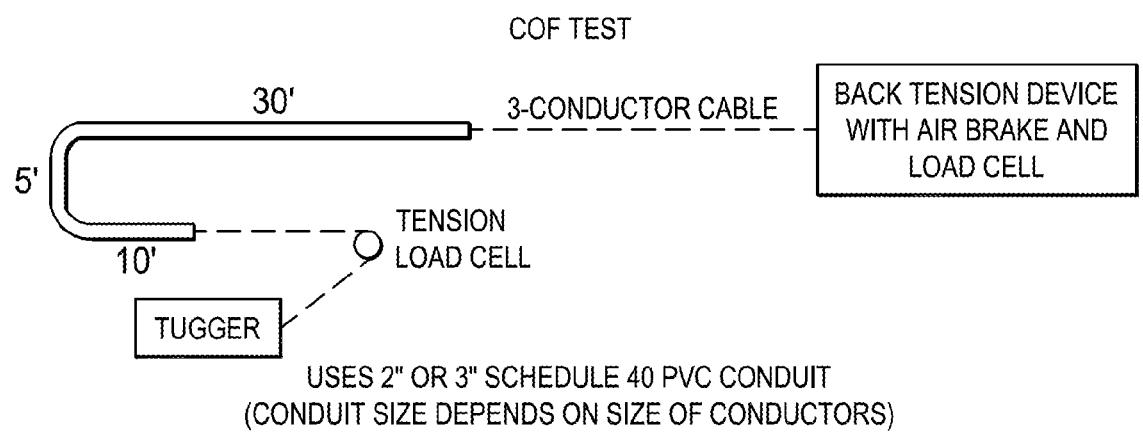
FIG. 2 is a representation of a test device which may be used in determining the coefficient of friction and related installation pulling forces of electrical cables of the present invention.

Referring now to FIG. 2, diagrammatically illustrated is the apparatus used to determine coefficient of friction for a given cable being pulled in conduit. The coefficient of friction test apparatus was developed to give a consistent way to determine the input values necessary to use the industry-standard program published by PolyWater Corporation to calculate a real-world coefficient of friction for a given cable being pulled in conduit. Given the inputs for the conduit setup, the back tension on the wire, and the pulling tension on the pulling rope, this program back-calculated a coefficient of friction for the cable by subtracting the back tension from the pulling tension and attributing the remaining tension on the rope to frictional forces between the cable and the conduit.

As shown in FIG. 2, the overall setup used a pulling rope threaded through ~40' of PVC conduit (appropriately sized for the cable being pulled) with two 90° bends, the pulling rope threaded through a load cell so that pulling force could be constantly monitored and logged. Attached to the pulling rope was a 100' piece of XHHW cable to be tested comprising three AWG 4/0 wires. The end of the XHHW test sample was attached to a metal cable which was wrapped around a cylinder with an air brake to allow the constant back tension on the set up. The metal cable providing back-tension was also threaded through a load cell so that it could be monitored in real-time, and continuously logged. Values for both back tension and pulling tension were logged for the time it took to pull cable through the conduit run. The resulting values were then averaged and used in the PolyWater program to calculate coefficient of friction.

Referring now to FIG. 3, graphically illustrated is a comparison of the resulting coefficient of friction for various cable samples (made using the formulations described above in Example I) containing various percentages of pulling lubricant. As shown in FIG. 3, the line corresponding to "Poly (yellow 77)" represents the "Control" sample containing standard Padanaplast crosslinked polyethylene in the exterior sheath (with no internal pulling lubricant) which was coated with Yellow 77 pulling lubricant on the exterior of the sheath for the coefficient of friction test. The line corresponding to "Poly (Dow)" corresponds to Samples V-Y (in which the additional polymer was a silane-ethylene copolymer rather than a pre-grafted resin). The results in FIG. 3 illustrate that sheaths prepared in accordance with the invention containing pulling lubricant in an amount in the range of from about 2 to about 15 weight percent based on the total weight of the composition reduces the coefficient of friction of the exterior surface of the cable more significantly than cables prepared without pulling lubricant.

Large Scale Tests

Various test cable samples (750 kcmil Aluminum XHHW, 500 kcmil Copper XHHW, and AWG 4/0 Copper XHHW) were prepared using the formulations of Sample I and the "Control" sample of Example I. The samples were subjected to a "large scale" test to simulate "real world" installation conditions. In this test, multiple individual XHHW wires were provided on payoffs and attached to a pulling rope that was threaded through an arrangement of 3" conduit that included a total of about 450 feet of conduit interspersed with a total of eight 90° bends. A pulling rope was attached to the conductors and a tugger was used to pull the cable arrangement through the conduit. The rope was threaded through a pulley arrangement that used a load cell to monitor rope tension while the wire was pulled through the conduit. This tension was continuously logged and averaged to give an average pulling force for the pull. This force correlated directly to the coefficient of friction for the cable. 4 separate pulls were conducted for the Control samples and 5 separate pulls were conducted for cables formulated using the Sample I formulation. FIGS. 4-7 illustrate a comparison of the different required pulling forces for the Sample I and Control formulations tested in 500 kcmil copper (FIGS. 4 and 5) and 750 kcmil aluminum (FIGS. 6 and 7) products. As illustrated in these figures, the Sample I formulation with the aluminum conductor (FIGS. 6 and 7) resulted in a lesser average pulling force than the standard XHHW product with the externally applied industry standard Y77.

In accordance with an advantage of the present invention, the pulling lubricant that is incorporated in the sheath is present at the outer surface of the sheath when the cable engages, or in response to the cable's engagement with, the duct or other structure through which the cable is to be pulled. For the cables of the present invention, where the outer sheath is of crosslinked polyethylene and the preferred pulling lubricant is polydimethylsiloxane, the lubricant permeates the entire crosslinked polyethylene sheath portion and is, in effect, continuously squeezed to the sheath surface in what is referred to as the "sponge effect," when the cable is pulled through the duct. Where the preferred lubricant is a fatty acid amide such as erucamide or oleamide, the lubricant migrates to the surface of the sheath.

Although the aforementioned description references specific embodiments and processing techniques of the invention, it is to be understood that these are only illustrative. For example, although the description has been with respect to electrical cable, it is also applicable to other types of non-electrical cable such as, for example, fiber optic cable. Additional modifications may be made to the described embodiments and techniques without departing from the spirit and the scope of the invention as defined solely by the appended claims.

What is claimed is:

1. A method of forming a crosslinked polyethylene electrical power cable sheath having pulling lubricant at a surface thereof after formation of an electrical cable and available at the time of installation to reduce pulling force necessary to install the electrical cable, comprising:

blending a crosslinkable silane-ethylene copolymer resin and a pulling lubricant selected from the group consisting of silicone and fatty acid amides to form a first polymeric blend, the crosslinkable silane-ethylene copolymer resin containing silane prior to blending with the pulling lubricant;

mixing in a single extruder the first polymeric blend, and a silane pre-grafted polyethylene as a second polymeric blend, together with a third polymeric blend comprising polyethylene, a flame retardant and a catalyst that is kept separate from the first polymeric blend and the second polymeric blend until the time of extrusion;

forming into a sheath for an electrical power cable by cooling with cooling water after forming the sheath; and crosslinking the sheath by moisture exposure to crosslink at least some of the first polymeric blend and some of the second polymeric blend to form the crosslinked polyethylene electrical power cable sheath for the electrical power cable, wherein the pulling lubricant does not deleteriously interfere with crosslinking and, in a finished electrical cable is available at the surface of the crosslinked polyethylene electrical power cable sheath to reduce pulling force necessary to install the finished electrical cable.

2. The method of claim 1, wherein the pulling lubricant is silicone and present in an amount in the range of from about 2 to about 15 weight percent, based on the total weight of the sheath.

3. The method of claim 1, wherein the pulling lubricant is silicone in a final amount of 1.25 wt %.

4. The method of claim 1, wherein the pulling lubricant is polydimethylsiloxane.

5. The method of claim 1, wherein the pulling lubricant is a fatty acid amide and present in an amount in the range of from about 2 to about 15% by weight, based on the total weight of the sheath.

6. The method of claim 5, wherein the fatty acid amide is erucamide.

7. The method of claim 5, wherein the fatty acid amide is oleamide.

8. The method of claim 1, wherein the silane-ethylene copolymer resin is moisture or steam curable.

9. The method of claim 1, wherein the processing comprises a continuous, homogeneous matrix.

10. The method of claim 1, wherein the first polymeric blend is in a range of from about 20 to about 99 weight percent based on the total weight of the composition.

11. The method of claim 1, wherein the moisture exposure comprises contacting the sheath with cooling water.

12. The method of claim 1, wherein in the first polymeric blend a silane compound is grafted onto the ethylene copolymer resin by reactive extrusion.

13. The method of claim 1, wherein the second polymeric blend is in a range of from about 18 to about 80 weight percent based on the total weight of the composition.

* * * * *